Feb. 14, 1928.

R. W. HAINER 1,658,894

CURVED TUBE VULCANIZING APPARATUS

Filed July 13, 1926

Inventor
Russell W. Hainer.

By

Attorney

Patented Feb. 14, 1928.

1,658,894

UNITED STATES PATENT OFFICE.

RUSSELL W. HAINER, OF AKRON, OHIO, ASSIGNOR TO THE GOODYEAR TIRE & RUBBER COMPANY, OF AKRON, OHIO, A CORPORATION OF OHIO.

CURVED TUBE-VULCANIZING APPARATUS.

Application filed July 13, 1926. Serial No. 122,116.

My invention relates to apparatus employed in the manufacture of inner tubes for pneumatic tire casings, and it has particular reference to a vulcanizing apparatus by which inner tubes are cured upon curved mandrels or cores.

One object of my invention is to provide a vulcanizing apparatus so designed that a material increase in the production of inner tubes may be effected without increasing the size of conventional heaters ordinarily employed incident to vulcanizing such inner tubes.

Another object of my invention is to provide an apparatus which includes a novel arrangement and construction of curved mandrels for curing inner tubes and which materially simplifies the vulcanization of various sizes of such inner tubes.

One of the known methods of vulcanization employed in the manufacture of inner tubes consists in wrapping sheets of rubber compound about curved or arcuate mandrels or cores, and mounting the cores upon a truck which is rolled into a cylindrical container where the rubber is subjected to vulcanizing heat. It is desirable to cure inner tubes upon curved mandrels in order that they may more readily conform to the curvature of the tire casings in which they are used without injuriously distorting the rubber of which they are made. Owing to the peculiar shape of the curved mandrels only a relatively small number of tubes could be vulcanized by the previously known apparatus during a single heating operation, and a considerable amount of heating space within the heater could not be utilized.

By employing an apparatus embodying the principles of my invention, a plurality of sets of curved mandrels are provided, the mandrels of the respective sets being of different degrees of curvature. These mandrels are so mounted on a specially designed truck that they are disposed substantially in coaxial relation to each other with respect to their curvature. The mandrels of greater curvature are adapted to circumferentially surround the mandrels of less curvature. An arrangement of this sort provides for a plurality of rows of mandrels adapted to be mounted upon one truck whereby two sets of tubes may be cured during a single heating operation. Consequently, within a specified period of time at least twice as many inner tubes can be vulcanized as was possible by the employment of apparatus of the type heretofore known.

Figure 1:
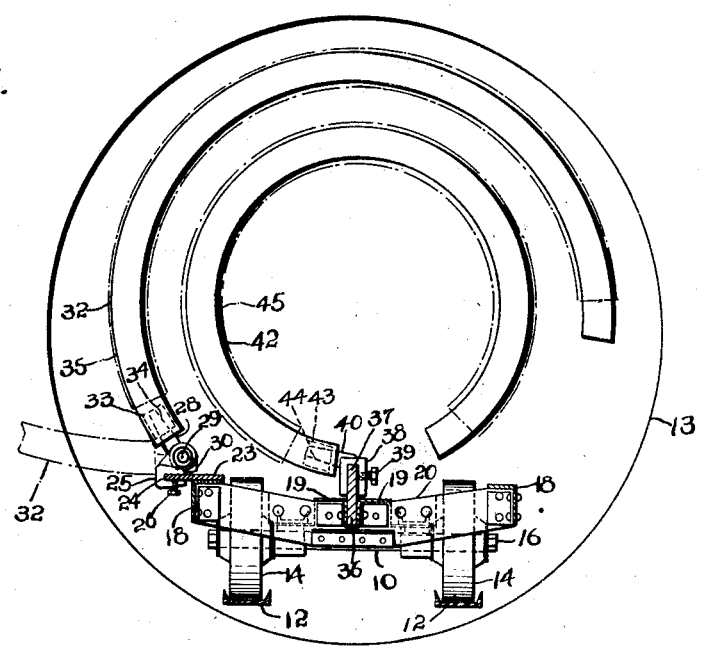
Figure 2:
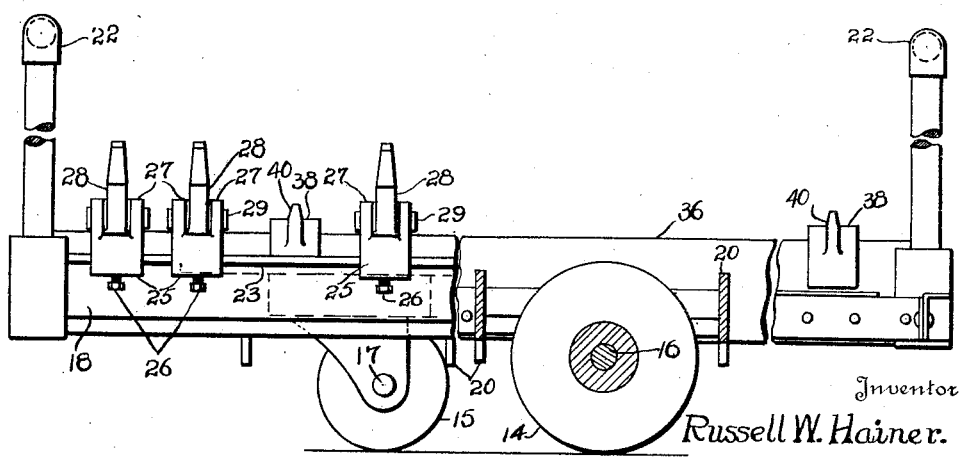

For a better understanding of my invention, reference may now be had to the accompanying drawings forming a part of this specification, of which:

Fig. 1 is a diagrammatic cross-sectional view of the heater, and of an apparatus embodying my invention disposed therein; and Fig. 2 is a fragmentary view, partially in cross-section and partially in elevation illustrating a truck constituting a part of my invention.

In practicing my invention, I provide a vulcanizing apparatus including a truck 10 which is adapted to be guided upon rail tracks 12 extending within and supported by a cylindrical heater designated by the numeral 13. Since the manner of arranging rail tracks for the purpose of rolling vulcanizing trucks into heaters of the type designated is well known in the art, a detailed description thereof is omitted from this specification.

The truck 10 is provided with a plurality of wheels 14 and 15 guided upon the tracks 12 and respectively mounted upon axial supports 16 and 17 which are mounted transversely of the frame 10; the latter consisting of longitudinal and transverse structural or bracing members 18, 19 and 20. Each end of the truck is provided with a transversely extending vertically disposed hand rail 22, which is adapted to facilitate manual rolling of the truck.

Adjacent one edge of the truck 10, an elongate plate 23 is secured to the longitudinal frame member 18, extending approximately from one end of the truck to the other and it is provided with an outer edge portion 24 overhanging the side of the truck. A plurality of clamping members 25 are removably secured to the edge portion 24 of the plate, by means of set screws 26. The upper portion of each clamping member 25 is provided with a pair of upright lugs 27 which are adapted to receive therebetween a relatively short tapered arm 28 pivoted to the lugs, as indicated at 29. In order to limit the pivotal movement of the arm 28 in clock-wise direction as viewed in Fig. 1, a lug 30 is formed integrally therewith which is adapted to engage the adjacent edge of the clamping member 25. Likewise, the surface of the clamping member between the lugs 27 is adapted to engage the shank of the arm 28, to limit its pivotal movement in an anti-clock-wise direction.

The outer tapered end of the arm 28 removably supports a curved tubular mandrel 32 which is provided with a block or plug 33 secured in one end thereof, the lug being formed with a tapered opening 34 into which a tapered end of the arm 28 is adapted to be inserted. It will be observed that the mandrel 32 is shaped substantially in the form of a segment of a circle and is adapted to serve as a forming and curing mandrel for an inner tube 35, indicated by dot and dash lines of Fig. 1. It is to be understood that the sheets of rubber material forming an uncured inner tube are applied to the mandrel prior to mounting the latter upon the arm 28.

As best shown in Fig. 1, a second elongate plate 36 is rigidly secured between the central elongate frame members 19 and extends substantially along the longitudinal center line of the truck 10. The plate 36 is provided with an upright edge portion 37 which is adapted to support a plurality of clamping members 38 secured thereto by means of set screws 39. Each of the clamping members 38 is provided with an integral inclined tapered arm 40 which functions similarly to the arm 28, by supporting a curved tubular mandrel 42, similar to the mandrel 32. A plug 43 is rigidly secured within one end of the mandrel 42, and is provided with a tapered opening 44, into which the arm 40 extends to support the mandrel. An inner tube 45, indicated by dot and dash lines, is formed on the mandrel 42 in substantially the same manner as that above described, with respect to the inner tube 35 and mandrel 32. In order to facilitate the mounting of the smaller mandrel 42, the mandrel 32 is pivoted about the pin 29 to the position indicated in dot and dash lines in Fig. 1. When the mandrel 32 is in this position, ample space is provided for properly mounting the mandrel 42 upon the arm 40.

It will be observed that the mandrels 32 and 42 are mounted upon their respective supporting members in substantially co-axial relation with respect to their curvature, and that the plate 36 is adapted to support a row of mandrels substantially surrounded by a similar row of mandrels supported upon the plate 23. As illustrated in Fig. 1, the adjacent outer and inner mandrels are adapted to be arranged substantially concentrically with respect to each other, although it is apparent that these respective mandrels need not necessarily be mounted in the same transverse plane. It is also apparent that more than two rows of mandrels may be provided without departing from the spirit of my invention.

From the foregoing description, it will be apparent that by the employment of an apparatus constructed according to my invention, the output from a single vulcanizing heater may be materially increased, and that the variation in degree of curvature of the mandrels adapt the apparatus for the manufacture of inner tubes suitable for various sizes of pneumatic tire casings without subjecting the finished tubes to the wide range of circumferential distortion usually imposed upon tubes as heretofore manufactured.

Although I have illustrated but one form which my invention may assume and have described in detail but a single application thereof, it will be apparent to those skilled in the art that it is not so limited but that various minor modifications and changes may be made therein without departing from the spirit of the invention or from the scope of the appended claims.

What I claim is:

1. A tube supporting apparatus comprising a frame and a plurality of rows of arcuate mandrels supported thereon, adjacent mandrels of the respective rows being arranged substantially concentrically with respect to each other.

2. The combination with a heater provided with rails, of a truck adapted to be rolled into the heater upon the rails, said truck being provided with a plurality of rows of arcuate mandrels, adjacent mandrels of the respective rows being arranged substantially concentrically with respect to each other.

3. The combination with a heater provided with rails, of a truck adapted to be rolled into the heater upon the rails, said truck being provided with a plurality of rows of arcuate mandrels, adjacent mandrels of the respective rows being arranged substantially concentrically with respect to each other, and means for pivotally mounting the mandrels of one row upon the truck.

4. The combination with a heater provided with rails, of a truck adapted to be rolled into the heater upon the rails, said truck being provided with a plurality of rows of arcuate mandrels, adjacent mandrels of the respective rows being arranged substantially concentrically with respect to each other, and a clamping member adapted to support each mandrel upon the truck.

5. The combination with a heater provided with rails, of a truck adapted to be rolled into the heater upon the rails, said truck being provided with a plurality of rows of arcuate mandrels, adjacent mandrels of the respective rows being arranged substantially concentrically with respect to each other and clamping members adapted to removably support the mandrels upon the truck, the clamping members including pivotal connections providing for pivotal movement of one row of mandrels.

6. A vulcanizing apparatus comprising a frame, a plurality of rows of arcuate mandrels mounted thereon, the mandrels of one row having a different degree of curvature from the mandrels of the adjacent row, and means for mounting all the mandrels in co-axial relation with respect to their arcuate curvature.

In witness whereof, I have hereunto signed my name.

RUSSELL W. HAINER.